United States Patent
Lin et al.

(10) Patent No.: US 7,733,542 B2
(45) Date of Patent: Jun. 8, 2010

(54) IMAGE READING APPARATUS AND OPTICAL MODULE THEREOF

(75) Inventors: Chia-Shin Lin, Hsinchu (TW); Ching-Jung Tu, Hsinchu (TW)

(73) Assignee: Avision Inc. (TW)

( * ) Notice: Subject to any disclaimer, the term of this patent is extended or adjusted under 35 U.S.C. 154(b) by 293 days.

(21) Appl. No.: 11/902,159

(22) Filed: Sep. 19, 2007

(65) Prior Publication Data
US 2008/0106770 A1 May 8, 2008

(30) Foreign Application Priority Data
Nov. 2, 2006 (TW) .............................. 95140626 A

(51) Int. Cl.
*H04N 1/04* (2006.01)
*G03G 15/00* (2006.01)

(52) U.S. Cl. ...................... 358/474; 358/482; 358/483; 358/496; 399/379; 399/367

(58) Field of Classification Search ................ 358/483, 358/482, 497, 494, 474, 471, 505, 496, 498; 250/208.1, 239, 234–236, 216; 399/211, 399/379, 367; 382/312, 318, 319
See application file for complete search history.

(56) References Cited

U.S. PATENT DOCUMENTS

| 6,445,480 | B1 * | 9/2002 | Huang et al. | 358/474 |
| 7,215,448 | B2 * | 5/2007 | Onishi | 358/483 |
| 7,310,171 | B2 * | 12/2007 | Huang et al. | 358/483 |
| 2007/0223062 | A1 * | 9/2007 | Tanaka et al. | 358/497 |

* cited by examiner

*Primary Examiner*—Cheukfan Lee

(57) ABSTRACT

An image reading apparatus includes a casing, an upper plate and a transparent plate. The casing has a first opening, and a reading means is disposed in the casing. The upper casing plate is disposed over the casing and has a second opening that is positioned opposite the first opening. The transparent plate is mounted on the first opening. The transparent plate is wedged in the second opening through assembly of the casing and the upper plate.

16 Claims, 6 Drawing Sheets

IMAGE READING APPARATUS AND OPTICAL MODULE THEREOF

This application claims the benefit of Taiwan application Serial No. 95140626, filed Nov. 2, 2006, the subject matter of which is incorporated herein by reference.

BACKGROUND OF THE INVENTION

1. Field of the Invention

The invention relates in general to an image reading apparatus and an optical module thereof, and more particularly to an image reading apparatus being dust-proof, and an optical module thereof.

2. Description of the Related Art

In addition to a scanner, the present commonly used image reading apparatus includes a digital photocopy machine and a multi-function printer (MFP) with scan function. In terms of the ways documents are scanned, the image reading apparatuses can be classified into the flatbed type, where the documents are still when being scanned, and the sheet-fed type, where documents are moving when being scanned. No matter whether the former or the latter type of the image reading apparatus is used, the image reading apparatus acquires the image of the documents through a scan window. If dust particles adhere to the scan window, the images obtained by the scan apparatus will be affected. Take a sheet-fed scanner as an example. Referring to FIGS. 1A and 1B, a partial schematic diagram of a conventional sheet-fed scanner and an exploded view of the scanner of FIG. 1A are respectively shown. As shown in FIGS. 1A and 1B, a sheet-fed scanner 1 includes a casing 10, an optical module 11, an upper plate 12, window glass 13 and a document-feeding device 14. The document feeding device 14 and the window glass 13 are both disposed on the upper plate 12. The optical module 11 is fixed in position in the casing 10 and facing the window glass 13. The document-feeding device 14 is for transporting a to-be-scanned document across the window glass 13 of the upper plate 12 such that the optical module 11 can read the images of the to-be-scanned document.

As shown in FIG. 1B, when the upper plate 12 is disposed on the casing 10, owing to a gap that exists between the upper plate 12 and the casing 10, dust particles will enter the casing 10 from the exterior via the gap. If the dust particles are attached to the window glass 13, the images generated will be greatly downgraded. Referring to FIGS. 1C and 1D, FIG. 1C is a schematic diagram of the scanner scanning a document and FIG. 1D is a schematic diagram of the image generated by the scanner of FIG. 1C. If the dust particles are attached to the upper surface of the window glass 13, the user can easily clean them out. However, as shown in FIG. 1C, if the dust particles (such as P1 and P2) are attached to the lower surface of the window glass 13 and located right on the scan line S of the optical module 11, when the to-be-scanned document A moves in the direction D and passes the window glass 13, the dust particles P1 and P2 will result in unexpected lines L1 and L2 on the image generated by the optical module 11 as shown in FIG. 1D.

In order to clean the lower surface of the window glass 13, normally, the scanner has to be taken apart before the cleaning operation, which is very inconvenient for the user. If the dust particles attached to the lower surface of the scan window are not cleaned out, the optical module 11 will scan the dust particles attached to the scan window 13 along with the to-be-scanned document A and the dust particles become a part of the scan image of the to-be-scanned document A.

SUMMARY OF THE INVENTION

The invention is directed to an image reading apparatus and an optical module thereof. By decreasing the gap between the transparent plate (such as a window glass) and the reading means (such as an optical module) to the minimum extent or disposing the transparent plate directly on the casing with the reading means, the dust particles can be prevented from adhering to the transparent plate.

According to a first aspect of the present invention, an image reading apparatus is provided. The image reading apparatus includes a casing, an upper plate and a transparent plate. The casing has a first opening, and a reading means is disposed in the casing. The upper plate is disposed over the casing and has a second opening that is positioned opposite the first opening. The transparent plate is mounted on the first opening. The transparent plate is wedged in the second opening through assembly of the casing and the upper plate.

According to a second aspect of the present invention, an image reading apparatus is provided. The image reading apparatus included a casing, an upper plate, a transparent plate, and a shielding member. The casing has a first opening, and a reading means is disposed in the casing. The upper plate is disposed over the casing and has a second opening that is opposite the first opening. The transparent plate is mounted on the second opening. The shielding member is located between the casing and the upper plate and around the transparent plate.

According to a third aspect of the present invention, an optical module is provided. The optical module includes a casing, a mirror set, a lens, a photo-sensing device, and a transparent plate. The mirror set, the lens and the photo-sensing device are disposed in the casing. The transparent plate is assembled on the casing.

The invention will become apparent from the following detailed description of the preferred but non-limiting embodiments. The following description is made with reference to the accompanying drawings.

DETAILED DESCRIPTION OF THE INVENTION

Figure 2A:
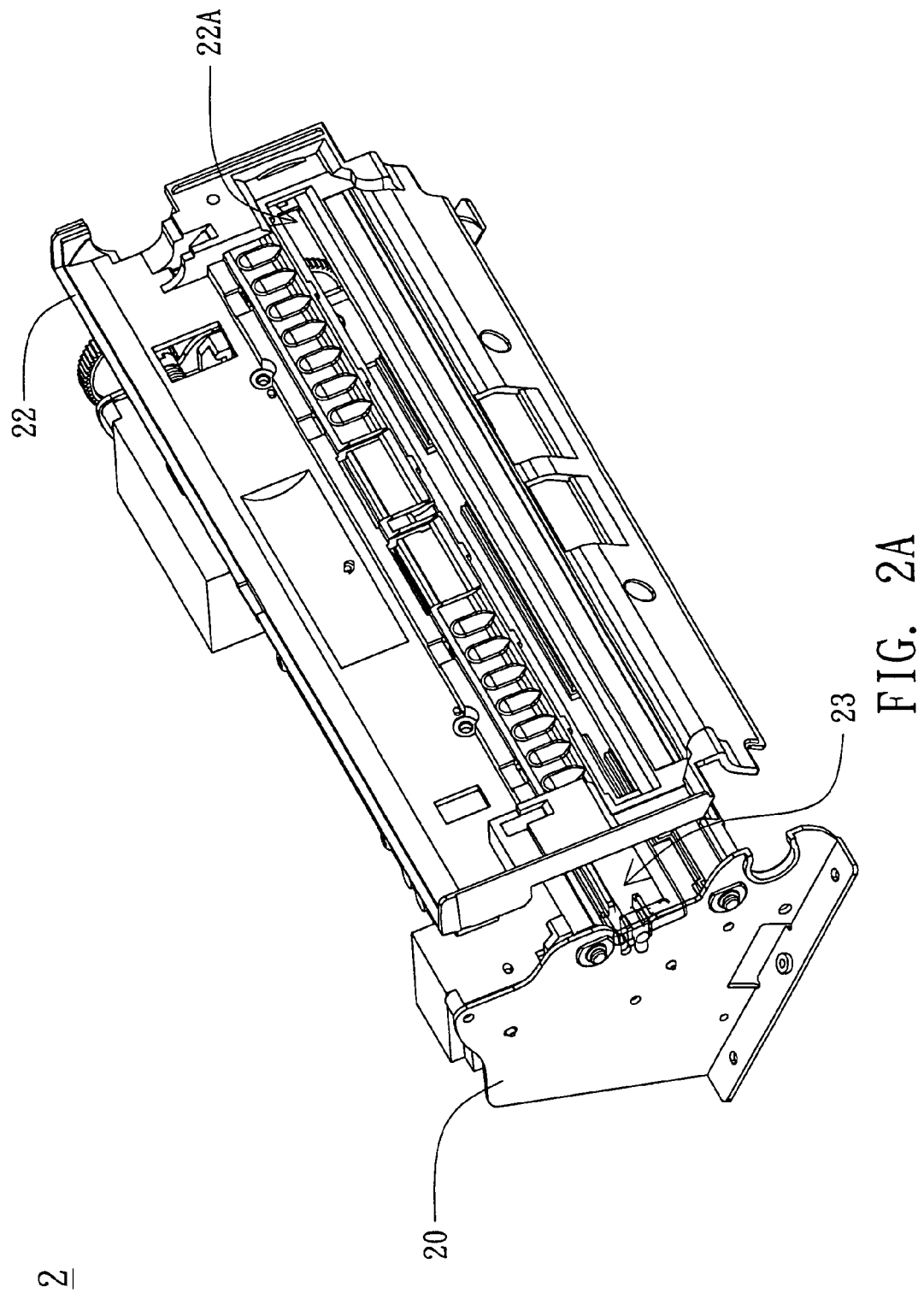
FIG. 2A is an exploded view of an image reading apparatus according to a preferred embodiment of the invention.
Figure 2B:
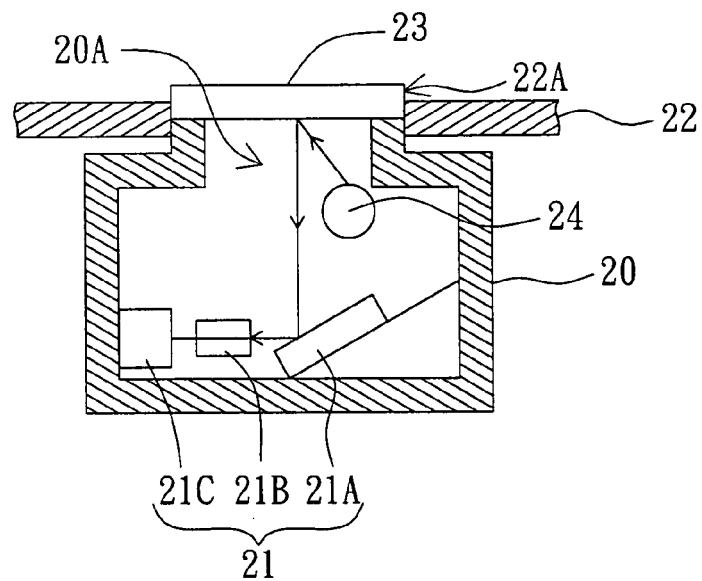
FIG. 2B is a cross-sectional view of the disposition of the transparent plate of FIG. 2A.

Referring to FIGS. 2A and 2B, an exploded view of an image reading apparatus according to a preferred embodiment of the invention and a cross-sectional view of the disposition of the transparent plate of FIG. 2A are respectively shown. As shown in FIGS. 2A and 2B, the image reading apparatus 2 includes a casing 20, a reading means 21, an upper plate 22 and a transparent plate 23. The reading means 21 is disposed inside the casing 20. The casing 20 has a first opening 20A. The upper plate 22 is disposed over the casing 20 and has a second opening 22A. The second opening 22A is positioned opposite the first opening 20A. The transparent plate 23 is mounted on the first opening 20A. The transparent plate 23 is wedged in the second opening 22A through assembly of the casing 20 and the upper plate 22. The transparent plate 23 is a commonly used window glass or made of acrylic material.

As shown in FIG. 2B, the reading means 21 includes a mirror set 21A, a lens 21B and a photo-sensing device 21C. The light beams radiated from a light source 24 pass through the transparent plate 23 and are reflected by the document (not shown in the figure) on the transparent plate 23 and then enter the casing 20. The light beams are reflected by the mirror set 21A and transmitted through the lens 21B. In the end, the light beams are received and converted by the photo-sensing device 21C to generate a scan signal. For example, the photo-sensing device 21C could be a charge-coupled device (CCD).

For example, the image reading apparatus 2 is a sheet-fed scanner and includes a feeder (not shown in the figure) disposed on the upper plate 22 for transporting the to-be-scanned document across the second opening 22A along a surface of the upper plate 22 in order that the reading means 21 can read data of the to-be-scanned document. Because the transparent plate 23 is disposed on the first opening 20A of the casing 20 first and then wedged in the second opening 22A through assembly of the casing 20 and the upper plate 22, as shown in FIG. 2B, the lower surface of the transparent plate 23 can be completely sealed in the casing 20, thus inhibiting the dust particles attached to the lower surface of the transparent plate 23.

It is noted that the casing 20, the reading means 21, and the transparent plate 23 can also form a single optical module.

In addition to the above combination way, the transparent plate 23 can also be combined with the casing 20 in any other way, which will be illustrated accompanied with drawings as follows.

Figure 2C:
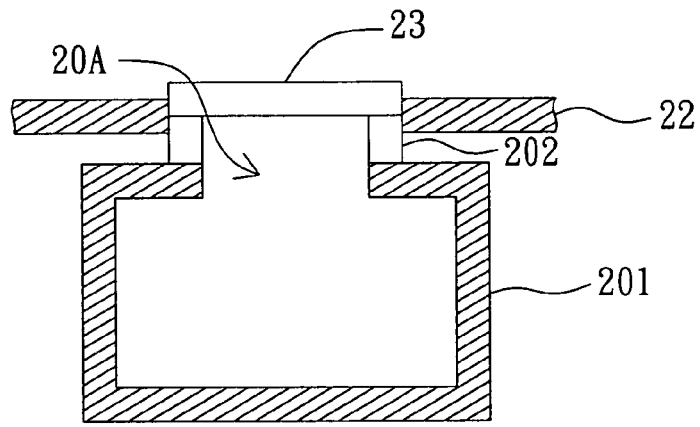
FIGS. 2C and 2D are schematic cross-sectional views of two other ways of the disposition of the transparent plate of FIG. 2A.
Figure 2D:
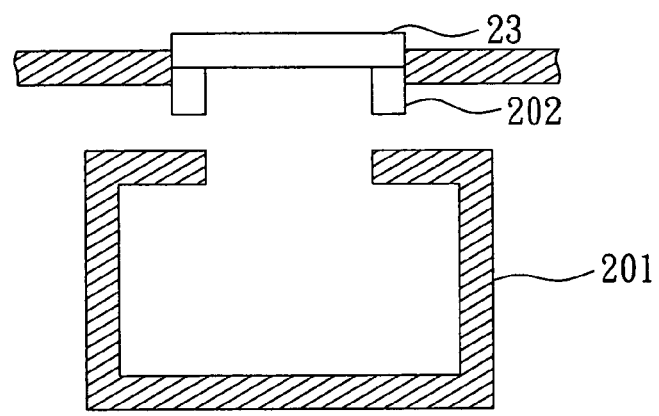

Referring to FIGS. 2C and 2D, schematic cross-sectional views of two other ways of the disposition of the transparent plate of FIG. 2A are shown. In order to simplify the drawings, in the following drawings, the reading means 21 and the light source 24 are omitted. The casing 20 includes a first casing 201 and a second casing 202. The reading means 21 is disposed in the first casing 201. The second casing 202 is located between the first casing 201 and the upper plate 22. The second casing 202 has the first opening 20A and the transparent plate 23 is mounted on the first opening 20A. The second casing 202 can be regarded as a carrying frame used for the transparent plate 23. As shown in FIG. 2C, the second casing 202 can be disposed on the first casing 201; or as shown in FIG. 2D, a gap is formed between the second casing 202 and the first casing 201.

Either in FIG. 2B or FIG. 2C, the lower surface of the transparent plate 23 has been isolated from the exterior. Therefore, it can effectively prevent the dust particles from entering and adhering to the transparent plate 23. As for the configuration shown in FIG. 2D, because the gap between the transparent plate 23 and the first casing 201 is reduced by the disposition of the second casing 202, there is not much a chance for the dust particles to fall on the transparent plate 23.

Figure 1A:
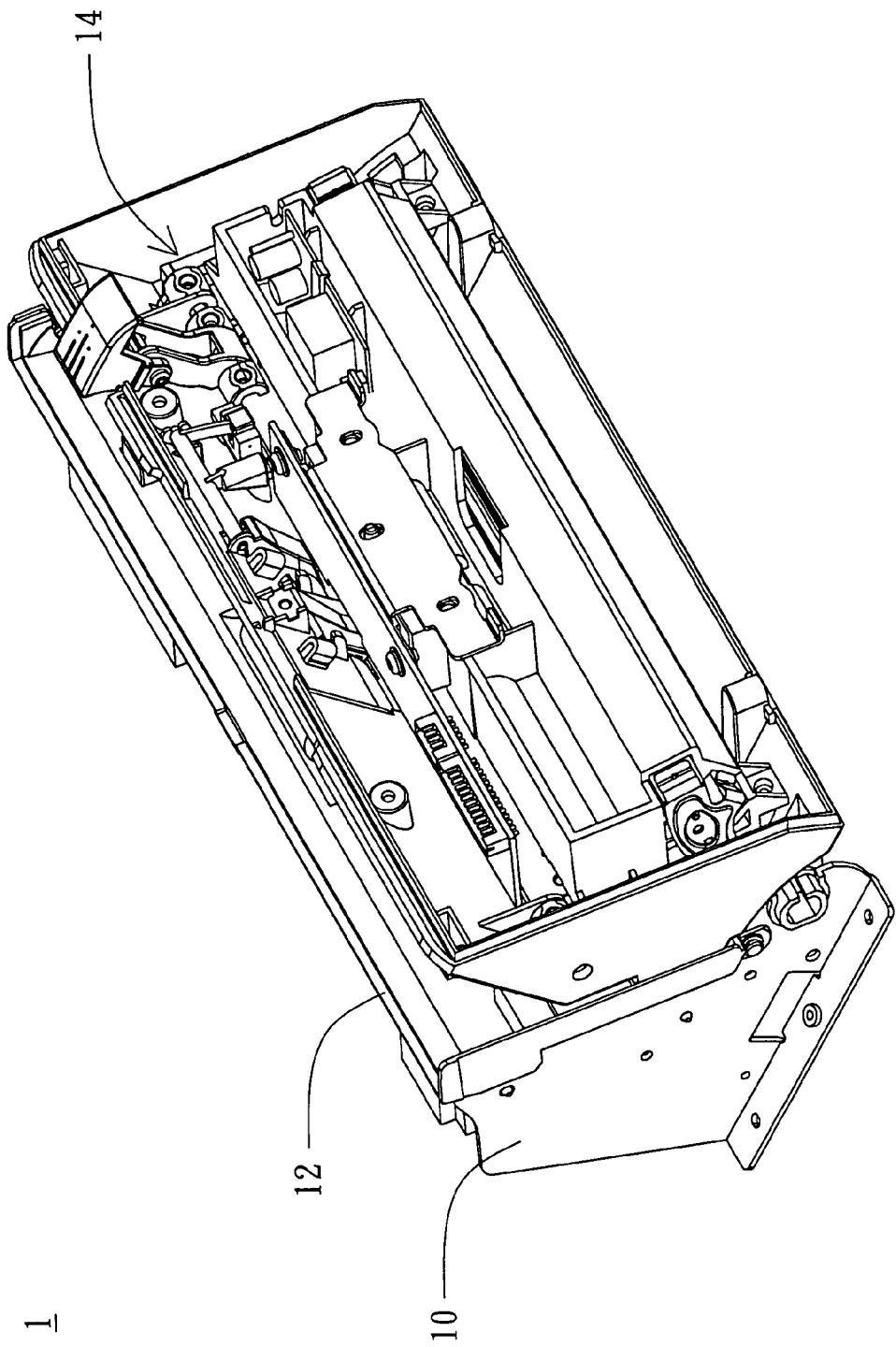
FIG. 1A is a partial schematic diagram of a conventional sheet-fed scanner.
Figure 1B:
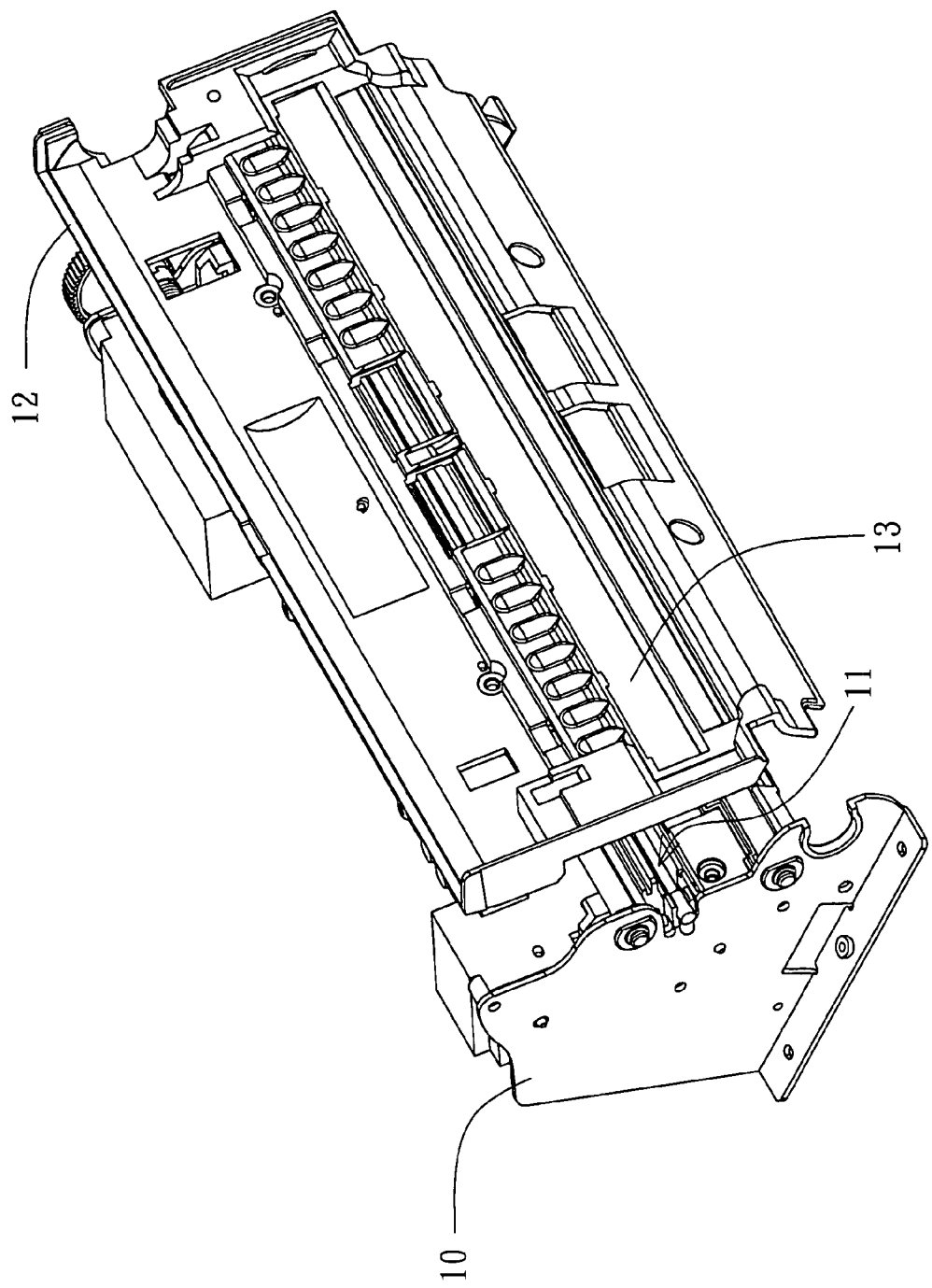
FIG. 1B is an exploded view of the scanner of FIG. 1A.
Figure 1D:
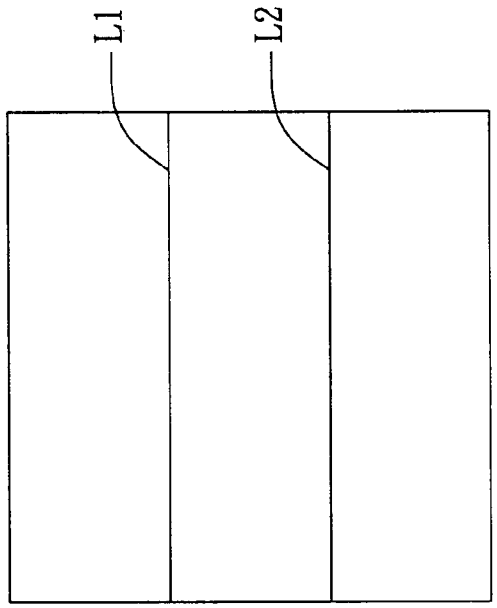
FIG. 1D is a schematic diagram of the image generated by the scanner of FIG. 1C.
Figure 1C:
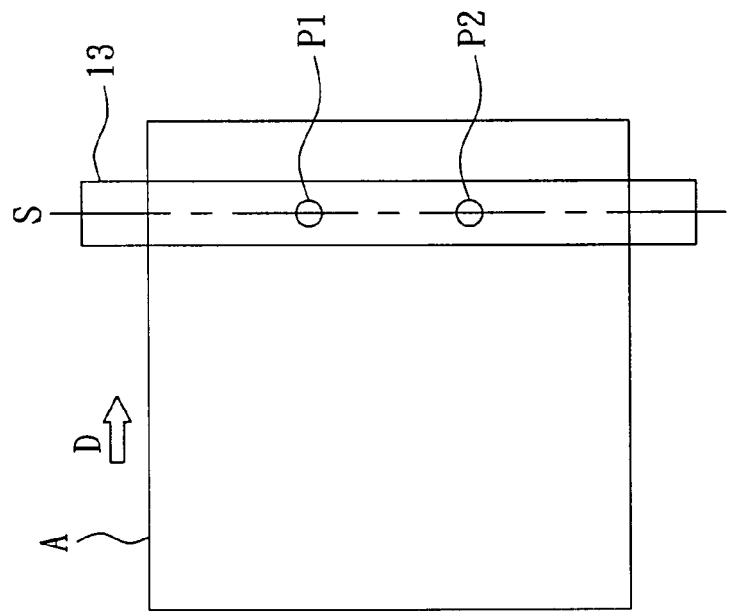
FIG. 1C is a schematic diagram of the scanner scanning a document.
Figure 3A:
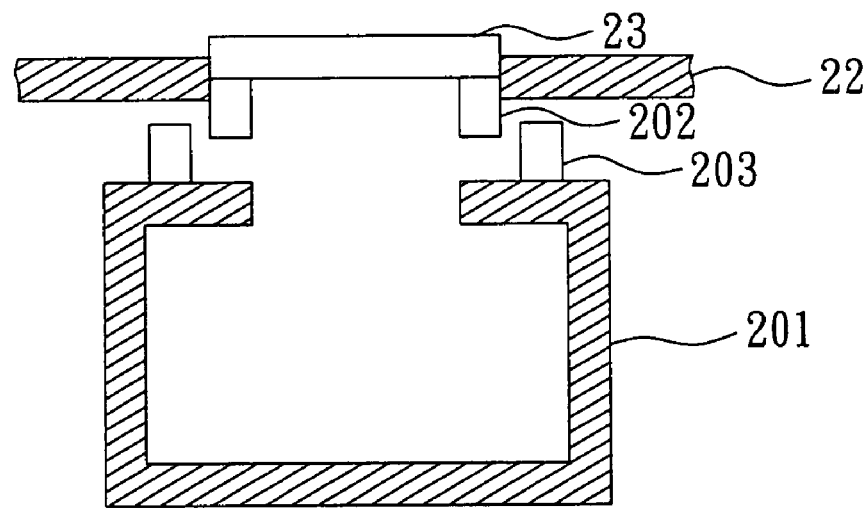
FIGS. 3A and 3B are a first and second cross-sectional views of the transparent plate of FIG. 2D with the shielding member.
Figure 3B:
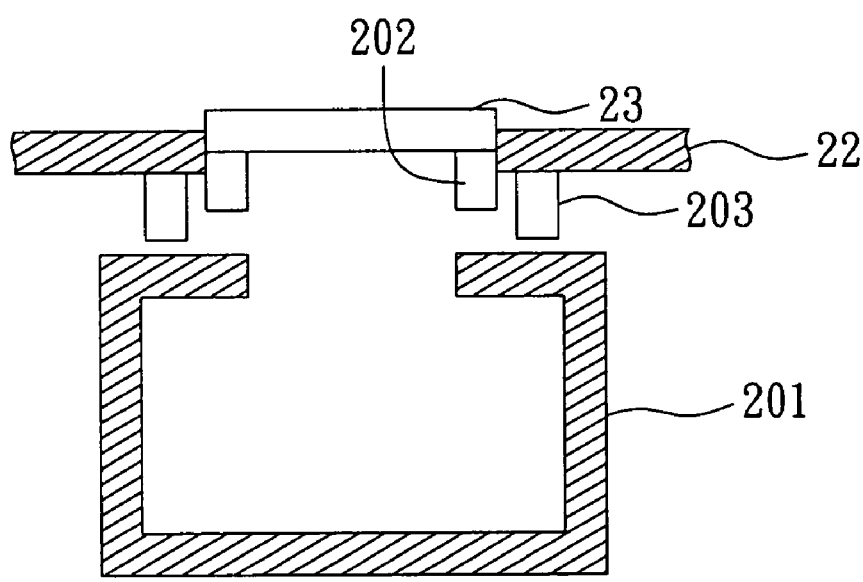

Besides, in order to achieve the dust-proof effect, any other shielding member can also be employed to surround the window glass 13 of the conventional scan apparatus as shown in FIG. 1B or the transparent plate 23 of the image reading apparatus 2 of the embodiment of the invention as shown in FIG. 2A to partially or completely isolate the window glass 13 or the transparent plate 23 from the exterior. For example, the image reading apparatus 2 further includes a shielding member. Preferably, the shielding member is located between the casing 20 and the upper plate 22 and around the transparent plate 23. Referring to FIGS. 3A and 3B, a first cross-sectional view and a second cross-sectional view of the transparent plate of FIG. 2D with the shielding member 203 disposed around the transparent plate are respectively shown. As shown in FIG. 3A, the shielding member 203 is disposed on the first casing 201, for instance. Or as shown in FIG. 3B, the shielding member 203 is disposed on the upper plate 22. Of course, although the disposition of the transparent plate 23 shown in FIG. 2D is exemplified in the embodiment, as long as at least a shielding member is disposed around the transparent plate or window glass to achieve the dust-proof purpose, any alternative will not depart from the scope of the invention.

The image reading apparatus and the optical module thereof disclosed by the above embodiment of the invention can prevent the exterior dust particles from adhering to the lower surface of the transparent plate by directly disposing the transparent plate on the casing with the optical module or reducing the gap between the transparent plate and the casing. Therefore, the quality of the images generated by the optical module will not be affected by the dust particles.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image reading apparatus, comprising:
   a casing having a first casing and a second casing, wherein the second casing having a first opening is disposed in accordance with the first casing, a reading means is disposed in the first casing;
   an upper plate, disposed over the casing and having a second opening, wherein the second opening is positioned opposite the first opening; and
   a transparent plate, mounted on the first opening of the second casing;
   wherein the transparent plate is further wedged in the second opening through assembly of the casing and the upper plate.

2. The image reading apparatus according to claim 1, wherein
   the second casing is wedged in the second opening of the upper plate.

3. The image reading apparatus according to claim 1, wherein the second casing is disposed on the first casing.

4. The image reading apparatus according to claim 1, wherein a gap is formed between the second casing and the first casing.

5. The image reading apparatus according to claim 4, wherein the second casing further comprises:
   a shielding member, surrounding the transparent plate.

6. The image reading apparatus according to claim 1, wherein the reading means comprises a mirror set, a lens, and a photo-sensing device.

7. The image reading apparatus according to claim 6, wherein the photo-sensing device is a charge coupled device (CCD).

8. The image reading apparatus according to claim 1, further comprising:
a feeder, for transporting a document across the second opening along a surface of the upper plate, such that the reading means reads data of the document.

9. The image reading apparatus according to claim 1, wherein the image reading apparatus is a sheet-fed scanner.

10. An image reading apparatus, comprising:
a casing having a first casing and a second casing, wherein the second casing having a first opening is disposed in accordance with the first casing, a reading means is disposed in the first casing;
an upper plate, disposed over the casing and having a second opening, wherein the second opening is positioned opposite the first opening;
a transparent plate, mounted on the second opening of the upper plate; and
a shielding member, located between the casing and the upper plate and around the transparent plate.

11. The image reading apparatus according to claim 10, wherein the shielding member is disposed on the casing.

12. The image reading apparatus according to claim 10, wherein the shielding member is disposed on the upper plate.

13. The image reading apparatus according to claim 10, wherein the reading means comprises a mirror set, a lens and a photo-sensing device.

14. The image reading apparatus according to claim 13, wherein the photo-sensing device is a charge-coupled device (CCD).

15. The image reading apparatus according to claim 10, further comprising:
a feeder, for transporting a document across the second opening along a surface of the upper plate, such that the reading means reads data of the document.

16. The image reading apparatus according to claim 10, wherein the image reading apparatus is a sheet-fed scanner.

* * * * *